United States Patent

[11] 3,607,087

| | | |
|---|---|---|
| [72] | Inventor | Ward A. Graham<br>Kansas City, Mo. |
| [21] | Appl. No. | 866,583 |
| [22] | Filed | Oct. 15, 1969<br>Division of Ser. No. 363,758,<br>Apr. 30, 1964, abandoned. |
| [45] | Patented | Sept. 21, 1971 |
| [73] | Assignee | Stratford Engineering Corporation<br>Kansas City, Mo. |

[54] GAS-LIQUID CHEMICAL REACTION APPARATUS
7 Claims, 10 Drawing Figs.

[52] U.S. Cl. .................................................. 23/252,
23/284, 23/285, 159/4 S
[51] Int. Cl. ..................................................... B01,
B01j, B01d 1/16
[50] Field of Search ........................................ 159/4, 4 B,
4 D, 4 I, 4 S, 48, 48 L; 299/224, 543; 23/252, 284, 285

[56] References Cited
UNITED STATES PATENTS

| 1,964,858 | 7/1934 | Peebles .......................... | 159/4 S |
| 2,990,011 | 6/1961 | Stratford ....................... | 159/4 S |
| 3,112,239 | 11/1963 | Andermatt ..................... | 159/4 B |
| 3,057,700 | 10/1962 | Gross ............................. | 23/283 |
| 3,212,235 | 10/1965 | Markant ........................ | 159/48 L X |

Primary Examiner—Norman Yudkoff
Assistant Examiner—J. Sofer
Attorney—Scofield, Kokjer, Scofield & Lowe ABSTRACT: Methods of and apparatus of intimately contacting a liquid phase with a gas phase to effect a chemical reaction. Particularly, methods of and apparatus for sulfonating organic sulfonatable compounds with sulfur trioxide as the sulfonating agent to produce products substantially free of undesirable byproducts of the sulfonating agents. A reaction vessel comprising a closed vessel having within the upper, reaction zone portion thereof reactive gas inlet means, optional gas blast means, and a first liquid atomizing rotor operable to disperse liquid therefrom in a lightly atomized condition thereby to provide a substantially continuous screen of dispersed liquid across the full section of the vessel. A vapor withdrawal line is positioned beneath the first liquid atomizing vapor. The vessel also optionally includes a second liquid atomizing rotor beneath the first liquid atomizing rotor to provide a second gas-liquid contacting or liquid-liquid contacting operation. A bottom product line permits withdrawal of the products from the reaction vessel.

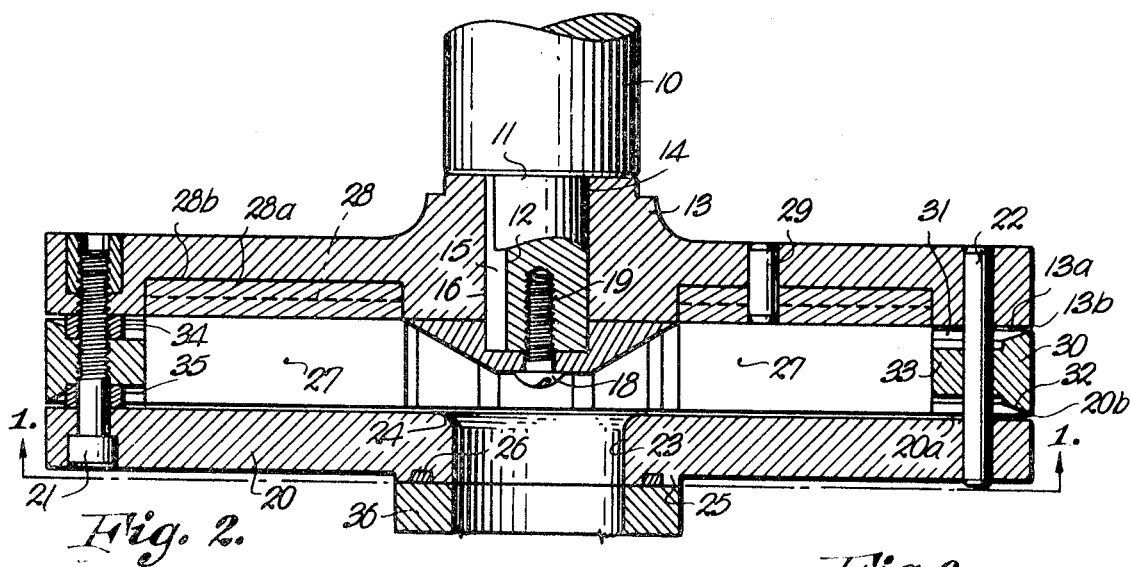
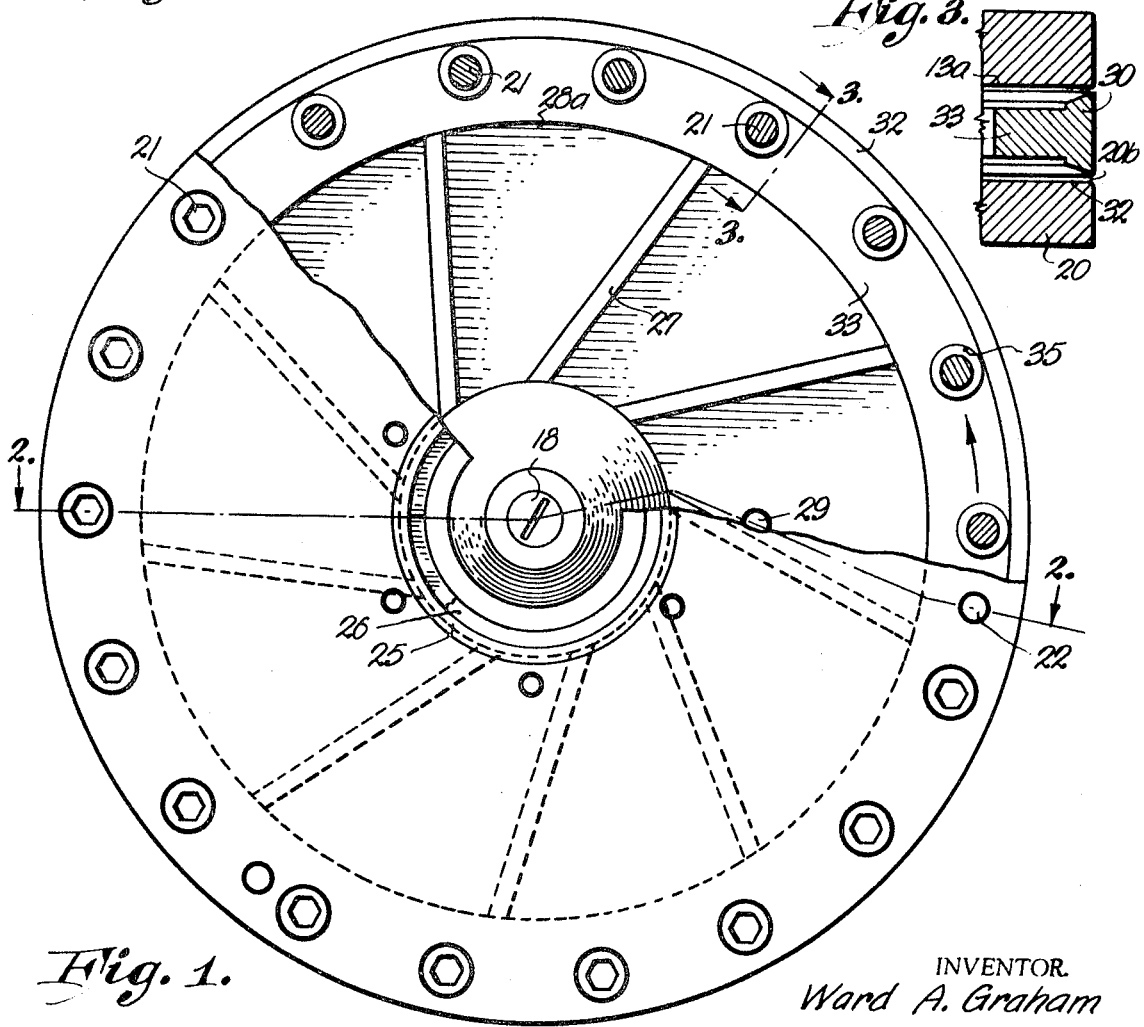

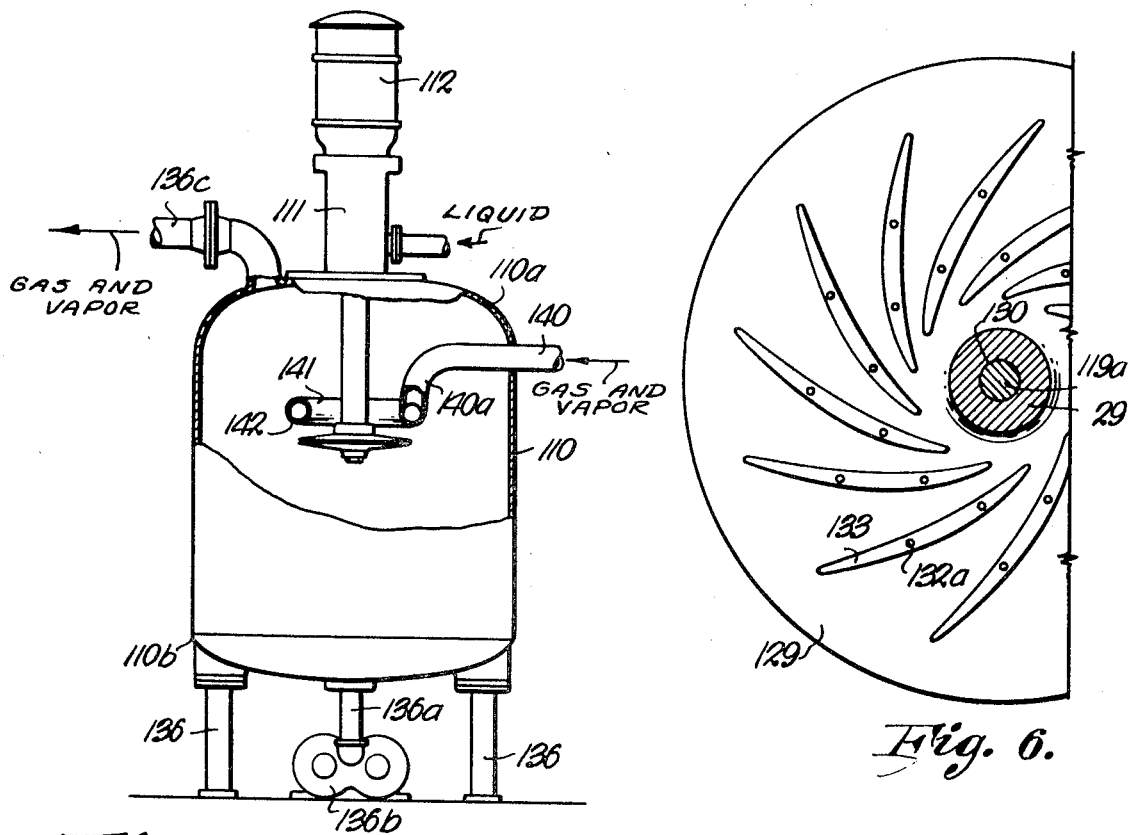
Fig. 4.
Fig. 6.
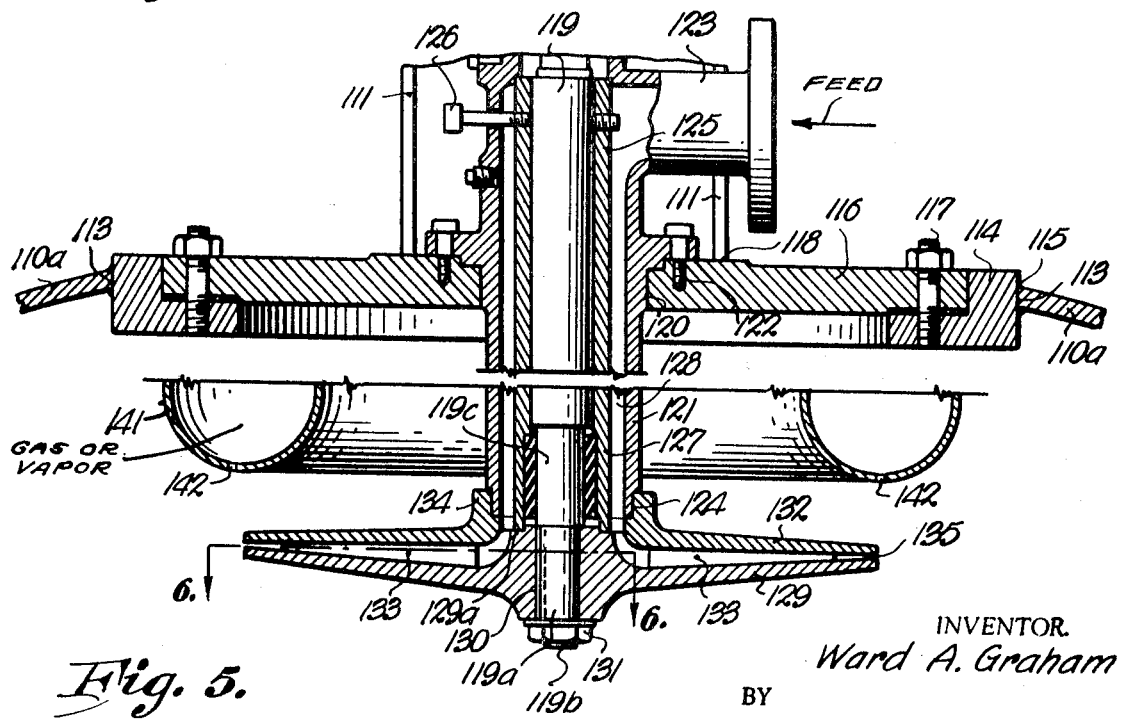
Fig. 5.
INVENTOR.
Ward A. Graham
BY
ATTORNEYS.

INVENTOR.
Ward A. Graham

BY

ATTORNEYS.

GAS-LIQUID CHEMICAL REACTION APPARATUS

This application is a division of my copending application Ser. No. 363,758, filed Apr. 30, 1964, "Chemical Reaction Method and Apparatus (Sulfonation)," now abandoned.

BACKGROUND OF THE INVENTION

This application is an improvement over my applications Ser. No. 112,270, filed May 5, 1961 "Gas Atomization Method and Apparatus," now abandoned, Ser. No. 254,215, filed Jan. 28, 1963 "Multiple Orifice Atomizing Evaporator," now abandoned, Ser. No. 290,758, filed June 26, 1963 "Multiple Orifice Evaporator," now abandoned; this application is also an improvement over the U.S. Pat. to Herbert W. Stratford No. 3,056,851, issued Oct. 2, 1962 "Sulfur Trioxide Sulfonation Method"; Herbert W. Stratford U.S. Pat. No. 2,990,011, issued June 27, 1961 "Flash Evaporator Rotor"; Stratford Ser. No. 730,874, filed Apr. 25, 1958 "Sulfonation Methods," now abandoned; Massa Ser. No. 144,977, filed Oct. 13, 1961, "Multiple Stage Flash Evaporator," now abandoned; and Stratford Ser. No. 214,452, filed July 30, 1962 "Sulfur Trioxide Sulfonation Method," now abandoned.

Petroleum sulfonates have a wide range of uses, for example, they may be used as synthetic detergents which are used as substitutes for soap and have particular value as blending agents for lubricating oils in which they act as detergents and corrosion inhibitors. Petroleum sulfonates may be prepared by contacting a petroleum oil with oleum and converting the resultant acid oil to sulfonates. However, petroleum sulfonates produced by this process are of only fair quality and are obtained in only moderate yields due to large amounts of sludge formed in the acid contacting step. The sludge contains sulfonic acids which, however, are in an unusable form in the sludge and, therefore, these valuable acids are lost with the discarded sludge. A further disadvantage of the formation of large amounts of sludge is that the sludge is difficult to separate and a substantially sludge-free acid oil is required to produce good quality sulfonates.

Petroleum sulfonates may also be produced by contacting a petroleum oil with sulfur trioxide and converting the resulting acid oil to sulfonates. This method produces somewhat higher yields than are obtainable with oleum because the volume of sludge is materially reduced and, therefore, less of the usable sulfonic acids are lost. However, sulfonation of petroleum oils with sulfur trioxide presents difficulties in that sulfur trioxide reacts violently and often forms sulfonates as well as a very stiff sludge thus causing sulfonic acid losses and complicating the operation.

It has been generally recognized in the sulfonation art that sulfur trioxide in its free form theoretically provides an ideal sulfonating agent because of its highly reactive nature and because it sulfonates organic compounds without the simultaneous production of water as a byproduct, thus eliminating the formation of a sulfuric acid phase in the reaction mixture which is difficult to separate therefrom and which, in the use of other sulfonating agents such as oleum, concentrated sulfuric acid, and others, represents a waste of reagent and involves useless processing procedures in separating the same from the sulfonating reaction mixture. It has also become apparent in the sulfonation art that, in order to utilize sulfur trioxide directly as a sulfonating agent for most organic compounds, some means of controlling the extreme reactivity of the sulfur trioxide must be provided if the product is to be relatively free of colored impurities, such as resinous and carbonaceous discoloration products of the organic charging stock.

SUMMARY OF THE INVENTION

Therefore, an object of the invention is to provide methods of and apparatus for contacting a petroleum oil with sulfur trioxide wherein the violence of the acid contacting step is closely controlled and regulated and the volume of sludge formed is greatly reduced and closely controlled and regulated, thus minimizing sulfonic acid losses in the process.

Another object of the invention is to provide methods for producing sulfonates free of by-products of the reaction of sulfur trioxide with reagents utilized in the sulfonation process.

Another object of the invention is to provide methods of and apparatus for producing substantially pure sulfonic acids and neutral sulfonate salts therefrom.

Another object of the invention is to provide methods of and apparatus for sulfonating organic sulfonatable compounds which will produce a light colored, uniform product.

Another object of the invention is to provide methods of and apparatus for sulfonating organic sulfonatable compounds with sulfur trioxide as the sulfonating agent wherein a relatively short process time is employed to produce a uniform sulfonic acid, the total expired time from the input of charged stock to neutralization of the sulfonic acid requiring only a few minutes.

Another object of the invention is to provide improved methods and apparatus of sulfonating liquid hydrocarbons and liquefied fatty acids with vaporized sulfur trioxide.

Another object of the invention is to provide such methods and apparatus wherein it is possible to react the total quantity of gaseous sulfur trioxide with stoichiometric quantities of sulfonatable liquids whereby to achieve the greatest reaction efficiency.

Another object of the invention is to provide such methods and apparatus wherein the entire reaction step may be carried out in a single reaction vessel or a series of successive, series-coupled reaction vessels.

Another object of the invention is to provide such methods and apparatus wherein the reaction is carried out by atomizing the liquid to be sulfonated in a reaction vessel and atmosphere of sulfur trioxide.

Another object of the invention is to provide such methods and apparatus wherein the sulfur trioxide phase in the reaction is continuous and the liquid phase in the reaction discontinuous, opposite to conventional practice.

Another object of the invention is to provide such methods and apparatus wherein a continuous sulfonation process of considerable flow-through volume, considerably greater than that of conventional processes, is practicable.

Another object of the invention is to provide novel and advantageous methods and apparatus for reacting heavy reactive gases with liquids and liquids with liquids with extremely precise reaction control.

Another object of the invention is to provide such methods and apparatus of extreme simplicity, minimum cost, long use life, and ease of access for cleaning, replacement and repair.

Another object of the invention is to provide methods and apparatus for such purposes as may be substantially fully automated and require a minimum of supervision.

Another object of the invention is to provide such methods and apparatus wherein spray devices of varying characteristics to atomize liquid hydrocarbons may be utilized, said liquid hydrocarbons atomized in sulfur trioxide atmospheres, such spray devices preferably and optimally comprising centrifugal atomizing rotors with one or more atomizing orifice gaps.

Other and further objects of the invention will appear in the course of the following description thereof.

DESCRIPTION OF THE DRAWINGS

In the drawings, which form a part of the instant specification and are to be read in conjunction therewith, embodiments of the invention are shown and, in the various views, like numerals are employed to indicate like parts.

FIGS. 1–3, inclusive, illustrate a multiple orifice atomizing rotor of the type disclosed in my previous application Ser. No. 254,215, supra.

FIG. 1 is a view of the underside of the rotor taken along the line 1—1 of FIG. 2 in the direction of the arrows.

FIG. 2 is a view taken along the line 2—2 of FIG. 1 in the direction of the arrows, showing a transverse vertical section through the rotor.

FIG. 3 is a view taken along the line 3—3 of FIG. 1 in the direction of the arrows.

FIGS. 4-6, inclusive, show a gas atomization vessel and rotor of the type disclosed in my application Ser. No. 112,270, supra.

FIG. 4 is a side elevational view with parts cut away to better illustrate the internal construction of a reaction vessel utilizing gas blast atomization and having an atomizing rotor operative therewithin.

FIG. 5 is an enlarged sectional detail of the rotor, its feed and drive seen in FIG. 4.

FIG. 6 is a view taken along the line 6—6 of FIG. 5 in the direction of the arrows.

Figure 7:
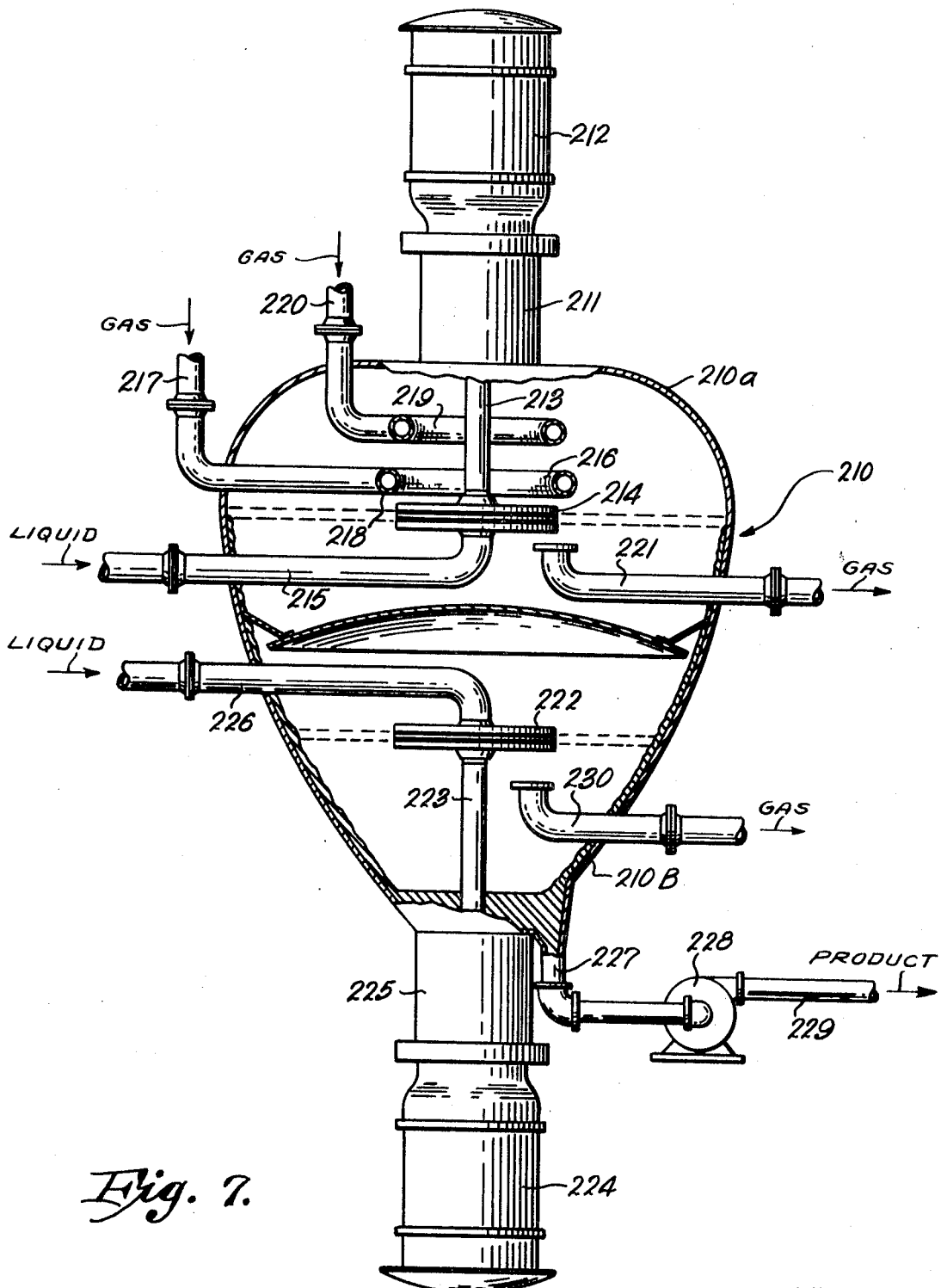
FIG. 7 is a side elevational view with portions thereof cut away to better illustrate the contents thereof of a reaction vessel particularly adapted for sulfonation wherein both an initial chemical reaction and a further stage thereof or quenching or neutralization thereof can be handled in a single vessel.

The present process is applicable to any feed stock which may be contacted with sulfur trioxide to effect sulfonation or sulfation thereof at the reaction conditions found to be suitable for the reaction. In specifying herein a "sulfonation process," a "sulfonatable organic compound," a "sulfonating agent" and "sulfonating conditions," it is intended that the us of the term "sulfonate" and derivative terms include reactions in which sulfonation is the end of the process as well as reactions in which sulfonation characterizes the end product.

Organic compounds within the broad class of sulfonatables include such compounds as the phenols and alkyl phenols, alcohols of both the aliphatic and alicyclic series, aromatic hydrocarbons such as the various benzene derivatives containing a nuclearly displaceable hydrogen atom which may be occupied by a sulfo radical and the polycyclic aromatic hydrocarbons containing napthyl, phenanthryl and anthryl nuclei, olefinic hydrocarbons, such as octene, decene, etc. and cycloolefins or their alkyl derivatives such as cyclohexene and ethylcyclohexene; heterocyclic compounds such as thiophene, pyridine and the like; ethers and esters such as phenylmethyl ether and the fatty acid glycerides, respectively, the latter class also including such compounds as the glyceride monoester or oleic acid, etc.; acids, such as benzoic acid and the aliphatic acids, particularly those containing an olefinic linkage such as oleic acid, and other compounds containing a replaceable hydrogen atom as well as various derivatives of the above classes of compounds containing noninterfering substitutes, such as one or more halogen, nitro, amino, keto, carboxyl, etc., groups.

The advantages of the present method of sulfonation are especially evident in the production of alkyl aromatic sulfonic acids which, when neutralized with a suitable basic reagent, such as an alkali metal hydroxide, an amine, or an alkanol amine, form highly effective detergent compounds. Suitable alkyl aromatic hydrocarbons and alkylated phenols sulfonatable by the present process to form detergents or detergent intermediates include, among others, the alkylated mono- and bicyclic aromatic compounds and phenols such as nonylbenzene, decylbenzene, dodecylbenzene, dodecyltoluene, pentadecylbenzene, pentadecyltoluene, amylnaphthol, amylnaphthalene, nonylphenol, decylphenol and other long chain substituted mono- and bicyclic aromatic hydrocarbons, phenols and naphthols.

The sulfated and sulfonated products of these charging stocks are ordinarily utilized in the form of their neutral salts in inorganic bases, such as sodium hydroxide, and when utilized as detergents for certain purposes, it becomes desirable in many instances to provide a product which is substantially free of inorganic salts such as the reaction product of the base and any excess sulfonating agent which may be utilized in effecting the sulfonation reaction, such as sodium sulfate formed by adding sodium hydroxide to a sulfonation reaction mixture containing an excess of the sulfonating agent.

The active component of the sulfonating agent utilized in the present process which produces the sulfate or sulfonic acid derivative of the sulfonatable organic compound charged to the process is sulfur trioxide in any of its various physical modifications. This reagent has become commercially available in three forms: the so-called "alpha" form which is a solid asbestoslike material melting at 62° C. and generally considered to be sulfur trioxide polymer, the "beta" form, believed to be a polymeric sulfur trioxide which is solid at normal temperatures and melts at about 33° C. and the "gamma" form which is a normally liquid physical modification of the sulfur trioxide at room temperature which melts at 17° C. Any of the above physical modifications of sulfur trioxide may be utilized in the present process, when vaporized into the gaseous phase or state in accordance with the procedure herein provided. The sulfur trioxide preferably employed in any invention is gaseous sulfur trioxide. The sulfur trioxide may contain a diluent gas, for example, air, nitrogen or sulfur dioxide.

MULTIPLE ORIFICE ROTOR ATOMIZER

Referring, then, to FIGS. 1-3, a vertical drive shaft 10, connected to any suitable source of power for rotational drive, such as an electric motor of conventional type, has lesser diameter lower end portion 11 thereon having key slot 12 in the side thereof. Fixed to the lower end of drive shaft 10 and encircling lesser diameter portion 11 is shrouding disc 13 having opening 14 extending through the central axis thereof. Key 15 in key slot 16 of disc 13 locks the disc 13 to shaft portion 11 for rotation therewith. Lower cap 17 receives threaded bolt 18 through a central opening therein, bolt 18 engaging internally threaded opening 19 centrally of the lower end of shaft portion 11. Cap 17 also has a slot therein to receive key 15.

A lower liquid accelerating disc 20 is removably fixed relative to shrouding disc 13 by threaded bolts 21 and pins 22 for rotation therewith. The outer diameter of disc 20 is preferably precisely that of disc 13. Both preferably have outer opposed or facing portions with flat horizontal surfaces 20a and 13a, respectively, accurately formed for purposes to be described. The peripheral or circumferential edges of surfaces 13a and 20a are preferably right angled as seen at 13b and 20b. Disc 20 preferably has feed opening 23 centrally and axially positioned therein with rounded inner edges 24. A downwardly extending circumferential flange or rim 25 is preferably provided surrounding the opening 23 having rotation bearing receiving recess 26 therein which preferably extends continuously around the opening 23 to provide a liquid seal.

A plurality of liquid accelerating vanes 27 are received in slots 28 formed in the underside of the flat ring 28a itself received in a recess 28b in the underside of disc 13, said ring secured therein by pins 29. Alternatively, the vanes 27 may be welded to the underside of disc 13. The rotation of the rotor is counterclockwise in FIG. 1, namely, looking upwardly from below at the rotor.

Means are provided to space the shrouding and liquid accelerating discs from one another at the peripheries thereof in such manner as to provide a plurality of slots or orifice gaps for passage of thin particularized films of liquid outwardly from the spinning rotor. Such means preferably comprise at least one circular ring 30 of outer diameter preferably exactly equal to the outer diameters of the discs and necessarily at least substantially so. Said ring is removably fixed between the two discs and so adjustably spaced therefrom as to provide any desired orifice gap on each side thereof between each disc and the ring surface next thereto. While the ring 30 may be rectangular in cross section whereby to provide two parallel surfaces, one positioned next each disc, it is much preferred to taper inwardly the sides of the ring adjacent the disc faces whereby to "wedge" the liquid fed into the rotor into the spray orifice gap. Thus ring 30 has tapered sides thereof 31 and 32 next discs 13 and 20, respectively. The portion of the ring inward of the tapered, liquid wedging zone thereof is of reduced thickness as seen at 33 whereby to permit the positioning of a plurality of spacers 34 and 35 on each side thereof to maintain the desired clearance between disc 13 and 20 and ring 30.

It is preferred that the liquid accelerating vanes 27 extend out into substantial or actual abutment with the inner terminus of the ring portion 33 whereby to provide liquid accelerating action directly into the ring zone. Vanes 27 are angled slightly from a true radial extension and may be curved. A static tubing or pipe 36 of an outer diameter equal to the outer diameter of the flange 25 and of an inner diameter substantially that of opening 23 is so positioned as to substantially frictionally abut the lower face of flange 25, lubricated by the bearings in the recess 26 whereby to provide a liquid seal in operation of the rotor. Suitable liquid to be moved out between the orifice gaps between the discs 13 and 20 and the ring 30 by centrifugal force is then forced up by pump or other pressure source into the annulus between the disc 13 and disc 20.

The orifice gap employed is preferably in the range disclosed in the U.S. Pat. of Herbert W. Statford No. 2,990,011, supra, although any suitable orifice gap for the liquid processing purposes set forth in this specification may be employed within or without this range. To vary the gap for different liquid processing purposes, the shims or spacers 34 and 35 may be replaced by others of different thickness. Shims or spacers 34 and 35 may be of differing thickness if orifices of different sizes above and below the ring are desired, but generally this is not the case. In sulfonation with sulfur trioxide vapor, it may be very beneficial to decrease the gaps from top to bottom. The continuous nature of the orifice gaps are clearly shown by FIG. 3.

It should be understood that the rotor and feedpipe of FIG. 2 may be inverted with drive from below and feed from above with no change whatsoever in operation of any portion of the rotor or change in effects or processing of liquid therein. In such case, the liquid accelerating disc becomes the shrouding disc and vice versa.

Other types of multiple orifice rotors adapted to the usages of this instant invention are found in my application Ser. No. 254,215, filed Jan. 28, 1963, "Multiple Orifice Atomizing Evaporator," supra, and Ser. No. 290,758, filed June 26, 1963, "Multiple Orifice Atomizing Evaporator."

GAS BLAST ATOMIZATION

Referring to FIG. 4, at 110 is shown a vessel having an upper portion 110a of its wall inclined both upwardly and inwardly relative to the interior of the vessel, relatively vertical sidewalls, and a lower wall 110b inclined both downwardly and inwardly relative to the interior vertical axis of the vessel. On top of vessel 110 is a motor mounting 111 which supports a motor 112.

Referring to FIG. 5, opening 113 formed in the top center portion of the vessel wall 110a and receiving rim 114 is fastened thereto by welds or other attachments 115. Mounting plate 116 is fixed within the rim 114 by bolts 117. The motor mounting 111 is welded or otherwise fixedly attached to the mounting plate 116 by attaching means or welds 118. Shaft 119 is a continuation of or fixed to the drive shaft of the motor 112 and is driven in rotation thereby. Plate 116 has an opening 120 centrally thereof. Support tube 121 is fixed to the plate 116 by bolts 122, extends therethrough, and has fitting 123 extending from one side thereof, as well as recessed portions 124 at the lower end thereof. Pipe 125 is supported by bolt 126 relative to support tube 121 and surrounds shaft 119 with sleeve bearing 127 fixed to the inside surface thereof whereby to maintain shaft 119 in position relative thereto. Feed annulus 128 between the outside of pipe 125 and the inner surface of tube 121 connects at its upper end with the bore of fitting 123 whereby to permit feed of liquids to be sulfonated, separated, treated, etc. therefrom.

Accelerated disc 129 (also see FIG. 6) forming the lower surface of the atomizing rotor, has opening 130 centrally therethrough to receive a lesser diameter portion 119a of shaft 119 therethrough. Nut 131 engages the threaded bottom portion 119b of shaft 119 and fixes the accelerating disc relative to the end of the shaft. The upper central portion of accelerating disc 129 abuts the undersurface of the slightly greater diameter portion 119c of the shaft. The upper surface of the accelerating disc is also recessed as at 129a to permit positioning of the lower end of pipe 125 is close association therewith. Disc 129 is preferably angled slightly upwardly in cross section as it extends outwardly from the central portion thereof.

Shrouding disc 132, forming the upper portion of the atomizing rotor, is fixed by bolts 132a to accelerating vanes 133 which, in turn, are fixed to accelerating disc 129. Shrouding disc 132 is preferably substantially horizontal, that is, fixed essentially at right angles to shaft 119. Shrouding disc 132 has upwardly extending central portion 134 which is recessed or indented to permit semiengagement of tube 121 and discs 132 and a portion of tube 121 to overlie a portion of the top edge of disc 132. Disc 132 and tube 121 are spaced, one from the other, to permit close rotation of disc 132 relative to tube 121 without contact therewith.

The annulus or space between accelerating and shrouding discs 129 and 132 connects at its inward end with the annulus between pipe 125 and tube 121 to permit feed of liquids or fluids to be stripped, flashed or treated into the rotating rotor where vanes 133 will hurl it through the orifice.

The orifice or circumferential opening 135 at the periphery of the two discs, to effectively operate to properly disperse the fluids, must be formed by two edges which are essentially vertically in line and preferably not over 0.020 of an inch apart. If either the periphery of the shrouding disc or the periphery of the accelerating disc extends past the other or the orifice therebetween exceeds 0.020 of an inch, the apparatus will not effect as efficient dispersal of the liquid or fluid to be stripped or flashed. The upward angling of the accelerating disc or, indeed, the relative angle of either of the discs relative to shaft 119, is not critical, provided the peripheries of both discs are essentially vertically in line and the orifice is of an aperture substantially in the range of from 1 to 20 thousandths of an inch.

The Stratford U.S. Pat. No. 2,990,011; supra, discloses a flash evaporator discharge orifice size range from 2 to 15 thousandths of an inch operative to produce certain critical results. The instant improvement extends the feasible orifice range of an atomizing rotor upwardly depending upon the velocity and quantity of vapor injected in the instant process. However, in actual practice of the process, the quantity and velocity of gas injection are both subject to limits, whereby the upward extension of the orifice gap range noted for any given task is also limited.

Referring again to FIG. 4, legs 136 support vessel 110 and an opening is positioned preferably centrally of the bottom wall 110b of the vessel withdrawal off line 136a leading therefrom with pump 136b connected thereto. Vapor exit line 136c may draw either from the top or bottom portion of the vessel and is connected to any suitable pressure reduction means of conventional type if the reaction is under reduced pressure. In operation of the rotor, per se, the liquid or fluid mixture to be treated is introduced into the fitting 123 where it passes down annulus 128 and into the space between shrouding and accelerating discs 132 and 129. In the throat of the rotor, the fluid is picked up by vanes 133 and rotation of the discs by shaft 119 moves the liquids or fluid mixture outwardly where it is projected through orifice 135 in the form of discrete particles of small dimensions which travel from the orifice to impinge upon the vessel wall. In certain applications of the invention, it is desired to elevate the rotor to impinge upon the upwardly and inwardly inclined surface 110a to aid coalescence and downward movement of the relatively viscous nonvolatile liquids. More volatile constituents, if present, can be evaporated from the finely divided energized particles during the traverse, such volatiles, in the form of water vapor, reaction by produce gases and the like being withdrawn from the confined space within the vessel through the vapor outlet 136c. Operation at reduced pressure would enhance such removal. A typical vacuum maintained in the vessel under certain operative conditions for certain operations would comprise the range of one-half inch to 10 inches of mercury absolute pressure.

According to my application Ser. No. 112,270, supra, I direct a vapor or gas stream at specified velocities closely across the lip or discharge orifice of the spinning rotor. Such a vapor stream or gas particle jet can be provided by so placing a vapor or carrier gas injection ring or other injection means so that it will discharge such vapor or gas particles in a direction preferably perpendicular or nearly so, to the plane or trajectory of the liquid particles emerging from the discharge gap of the rotor. I pass the vapor stream through a series of orifices, holes, openings, or a fine slot or slots or a combination thereof drilled or formed in said ring, preferably in a circle of equal diameter or slightly greater diameter relative to that of the rotor and its discharge orifice. The vapor or gas particle stream or streams can e directed either downwardly or upwardly or simultaneously in both directions, in the former cases from a single injection ring or device or in the latter case from two different injection rings or devices simultaneously.

Atomization being proportional to the vapor velocity, this, in turn, can be increased by increasing the gas pressure in the distributor ring or rings. Gas-liquid atomization as described will produce particles with diameters of 15 microns and less, even going as low as 1 to 2 microns in some instances. If 1 g. of water is atomized to spherical particles of 15 micron diameter, the number of particles would be $5.62 \times 10^8$ and the total surface area of the particles 4.26 sq. feet. For particles of 10 micron diameter, the same gram of water would yield $1.93 \times 10^9$ particles with a total surface area of 6.25 sq. feet. 5 micron diameter particles would number $1.54 \times 10^{10}$ with a total surface area of 13.04 sq. feet. Thus, it can be seen that this improved method of introducing the gas relative to the reactor rotor results in approximately 5 to 10 thousand times as many particles and approximately 1.5 to 60 times the surface area exposed.

The impingement of the input gas stream into the liquid discharged at the rotor orifice, at velocities higher and preferably much higher than the liquid velocity, produces a high degree of turbulence at the rotor lip resulting in increased atomization of the degree above-described. With vapor takeoff nozzle 136c located on the same side of the liquid film as the vapor injection ring, as seen in FIGS. 4 and 5, injected vapor (for example, vaporized sodium trioxide) both atomizes the liquid feed or increases atomization thereof, on its initial entrance and then recontacts the liquid particles from the rotor orifice as it reverses direction and is exhausted via takeoff nozzle 136c.

Variables affecting the velocity of the vapor or gas input through an injection ring or rings include (1) the diameter and/or number of holes drilled in the ring or the width of the slot cut therein, (2) the quantity of vapor introduced, (3) the temperature of the vapor introduced, (4) the absolute pressure maintained within the shell or vessel 110 and (5) the pressure drop across the injection ring.

The distance between the inlet vapor ring holes or slot and the discharge gap or orifice of the rotor also contributes to the degree of atomization obtained. For finest atomization, this distance should be approximately 1/16 inch to ⅛ inch. For lesser degrees of atomization, the difference may be increased from ½ inch to 1 inch, depending upon the variables listed above. Since revolutions per minute of the rotor in the range of 700 to 10,000 r.p.m. are common and, indeed, necessary in many cases, a certain clearance must be maintained between the vapor input ring or rings and the rotating rotor. However, as seen above, the closer the vapor input ring is placed in vertical spacing to the rotor itself, the better results obtained. Likewise, the closer in lateral spacing the gas injection ring is in its injection zone to the orifice lip, the better results obtained.

Referring to FIGS. 4 and 5, therein is shown a form of the invention wherein the gas or vapor injection ring is positioned closely above the rotor whereby to inject, blast or flow vapor or gas downwardly across the rim of the rotor or orifice gap thereof whereby to increase the atomization produced by the rotor itself. It should be particularly noted that, in FIGS. 4 and 5, the vertical spacing of the injection ring or rings from the rotor and the orifice gap therein has been exaggerated for clarity of illustration. In FIGS. 4 and 5, input flow pipe 140 passes through the sidewall of vessel 110, and is sealed therethrough. Pipe 140 curves downwardly to a vertical portion 140a immediately above the circular gas injection ring 141. Ring 141 is circular both in plan view and in cross section and has, in the example shown, an elongate slot or orifice gap 142 formed in the underside thereof whereby to discharge vertically downwardly gas or vapor injected into pipe 140. As seen in FIG. 5, the gas injection relative to the rotor is preferably vertically downward immediately at the rotor periphery whereby to provide turbulent impact of gas and liquid as close to the orifice gap as possible. The width of slot 142 is dictated by the quantity and velocity of gas required by the specific operation. As a typical example, in a ring of 20 inch diameter and having an internal volume of 800 cubic inches, a slot width of 1/16 inch would be typical. In the systems of FIGS. 4 and 5, as previously described, injection of gas through the screen of particles thrown out by the rotor will result in twice contacting the gas with the particles, once as they pass downwardly through the screen and secondly as they are drawn upwardly and out of the vessel through discharge vapor line 136c. The atomized and reacted liquid particles coalesce on the sidewall of the vessel and pass downwardly to the lower portion thereof to be withdrawn through line 136a under impetus of pump 136b.

Additional details and features of gas atomization are set forth in my application Ser. No. 112,270, supra. Such process may be employed relative to one or more atomized particle screws generated by a multiple orifice rotor as in FIGS. 1–3, inclusive, by employing therewith one or more gas injecting rings in the manner described above and in Ser. No. 112,270, supra above and/or below the rotor.

SULFONATION REACTOR

Referring to FIG. 7, at 210 is shown a vessel having an upper portion 210a of its wall inclined both upwardly and inwardly relative to the interior of the vessel, relatively vertical sidewalls, and a lower wall 210b relatively sharply inclined both downwardly and inwardly relative to the interior vertical axis of the vessel. On top of vessel 210 is a motor mounting 211 which supports a motor 212. Shaft 213 connects to motor 212 and drives multiple orifice rotor 214 connected to the end thereof. This rotor may be of the structure shown in FIGS. 1–3, inclusive. A feed pipe 215 extends under rotor 214 in the manner of the feedpipe 36 of FIG. 2 and out through the wall of vessel 210. Feed can also be down around the drive shaft housing.

A gas atomizing ring 216 analogous to gas atomization ring 141 in FIG. 5 is fed by line 217 also extending out of the wall of vessel 210. Atomizing ring has slot 218 in the underside thereof closely adjacent the top orifice of the rotor 214 circumferentially thereof. A nonblasting gas input ring 219 is shown positioned above the blasting ring 216 fed by feed line 220 is also exiting from the wall of vessel 210. A gas exhaust line 221 is positioned under rotor 214 and also exists from the sidewall of vessel 210 being connected to a suitable source of vacuum if reduced pressure is desired for the reaction.

A multiple orifice atomizing rotor 222 is positioned below lines 215 and 221 centrally of vessel 210. Rotor 222 is driven by shaft 223 by motor 224 mounted on the underside of 210b of vessel 210 by motor mount 225 or same could be driven by mounting it on the shaft from above. Rotor 222 may be the same as the rotor of FIGS. 1-3, inclusive inverted, whereby a feed line 226 enters the wall of vessel 210 and is associated with the upper portion of rotor 222 in the manner of the feedline 36 in FIG. 2. Feed can also be by appropriate connection around the drive shaft housing.

It should be understood that either rotor 214 or 222 may be replaced by a single orifice rotor in the manner shown in FIGS. 5 and 6, the rotor 214 being upright in the manner of the showing of FIG. 5, while the rotor 222 would necessarily be the same inverted or on the extended drive shaft. In such cases, feed lines 215 and 226 would be omitted.

Product withdrawal line 227 leads to pump 228 with discharge line 229 which alternately may lead to the feed line of a rotor 214' analogous to rotor 214 in another vessel 210', not shown. Vapor withdrawal line 230 extends to below the rotor 222 and its plane of discharge.

The reaction apparatus of FIG. 7 may be utilized in a sulfonation reaction in a number of ways. These variations will be described sequentially.

A first process utilization would involve the nonblasting gas input ring for the creation of a continuous phase sulfur trioxide gas atmosphere above the plane or planes of discharge from the rotor 214. It should be understood that the sulfur trioxide may be diluted, i.e., with air, in any of the process descriptions set forth in the instant specification. The use of a nonblasting gas input ring is particularly apropos with a single orifice rotor of the type shown in FIG. 5. It is not desired that the continuous phase sulfur trioxide atmosphere penetrate the discontinuous phase screen of atomized particles emitted from rotor 214. To completely obviate this, even in the case of nonblasting input, it is best to utilize a multiple orifice rotor at 214 to provide a multiplicity of screens of atomized discontinuous phase sulfonatable liquid particles, possibly smaller particles on lower planes, separating the reaction vessel into two zones, the zone above and the zone below the particle screens. It should be understood that the sulfonatable liquid may be diluted to a greater or lesser degree with a nonsulfonatable liquid such as a straight chain hydrocarbon.

Sulfur dioxide gas resulting from the sulfonation reaction would then be drawn off through line 221. The reaction product is collected through line 227 drawn by pump 228 and passed to line 229. In the event of the use of a multiple orifice atomizing rotor, it is preferable that the lower orifice or orifices beneath the top orifice of the rotor be scaled down to a minimum orifice opening to minimize the quantity of liquid passed from the lower orifices and thus the quantity of liquid least contacted with the sulfur trioxide. In the case of the use of a nonblasting gas input ring as at 219, and the use of a multiple orifice rotor at 214, then the passage of the product withdrawal liquid through line 229 to a second feed line 215' in a second such vessel with another pass at sulfonation in a single or multiple orifice rotor is preferred, or a series of same. Alternatively, the recycle system to be described may be employed.

As a variation in the process, the rotor 222 may be employed to spray in atomized quantities of neutralizing liquid such as caustic solution to aid in control of the sulfonation reaction and product quality. The vapor withdrawal line 230 may be employed if line 221 is insufficient for sulfur dioxide removal and for any other gas possibly generated by the diluent spray with respect to the reaction product in the sulfonation reaction or other reactions employed with the vessel 210.

Yet further, the gas blasting input ring 216 may be employed with the rotor 214 in either single or multiple orifice form, preferably the latter. In any case, in all forms, the sulfur trioxide and sulfonatable liquid are preferably put in stoichiometric quantities. In the event of the use of a multiple orifice rotor, say, two orifices, with the gas blasting ring 216, there is less necessity for recycle or series rotor reaction vessel practice.

The various apparatus elements of FIG. 7 may be employed in the reaction of any reactive gas with a reactive liquid in the manners described for sulfur trioxide with the creation of a continuous phase (reactive gas) sulfur trioxide atmosphere and a discontinuous phase liquid screen. It is not necessary to divide the vessel 210 into two zones as previously described, only preferable and optimal in most cases. Any spray device may be used, but the atomizing rotors described are optimal and preferable. There may or may not be the necessity for gas withdrawal as at lines 221 and 230. There may or may not be necessity or desirability of spray input of diluent or quenching or further reacting liquid as at rotor 222. The gas and liquid inputs to the reactor 210 may or may not be diluted or pure. As in the case of sulfur trioxide sulfonation, if there is a very highly reactive reaction system and one or both of the liquid and gas are pure, rather than considerably diluted, then the maintenance of flows of stoichiometric quantities is considerably critical; as is the maintenance of the division of the reaction vessel into two zones isolating the reactive gas atmosphere from the portion of the vessel from which the reaction produce is taken. It is possible to neutralize through rotor 222. The pressure may range in the vessel from a vacuum to a positive pressure. In the case of sulfonation wherein there is not attempt to separate reactor vessel 210 into two zones with the reactive gas above the reactive liquid particle screen, the position of takeoff of sulfur dioxide is not as critical. Thus, in the case of sulfonation in a system as in FIG. 4 where the sulfur trioxide would be blasted through a single orifice rotor particle screen, the sulfur dioxide takeoff could well be through line 136c.

The purpose of isolating, optimally, the sulfur trioxide atmosphere above the liquid particle atomized screen or screens is to minimize the possibility of multiple (poly) sulfonation to di, tri, etc., sulfuric acids. Polysulfonation, charring and tarring is greatly undesirable and the use of the diluent liquid through rotor 222 is also directed to minimizing this problem. It is not desired to have a gas-liquid reaction below the particle screen in the gravity liquid flow down the vessel all 210. It is desired to fine (or confine) the reaction wholly in the particle screen and at the impact point on the vessel wall. With less reactive gas-liquid systems, the penetration of the gas through the single or multiple films or screens is less critical. It is not desirable to use an excess of sulfur trioxide as such will be exhausted with the sulfur dioxide from lines 221 or 230 or both, but, in achieving the stoichiometric ratio input, the initial adjustment of the reaction to get a trace of sulfur trioxide in the sulfur dioxide exhaust and then scaling down to have same disappear is useful in making the said adjustment.

The speed of the sulfonation reaction, as a typical example of a highly reactive liquid-gas chemical reaction system is very fast, only a few hundredths of a second at most. It therefore becomes necessary to contact as large a surface area or quantity of the reactive hydrocarbon sulfonatable liquid with sulfur trioxide as fast as possible to avoid multiple or polysulfonation. Thus the very fine atomization possible with the rotors of the types described is extremely advantageous in achieving the maximum product control and permits the use of such pure reactants.

With a diluent in the sulfur trioxide, there will always be an excess on inert gas to carry off and thus the gas blasting system is optimal to carry through for complete reactivity and scavenge of inert gas through the lines 221 and 230. As the quantity of sulfonatable hydrocarbons in the sulfonatable liquid increases, then contact of the gas with the liquid to achieve results in a single pass becomes more critical and the gas blasting system is more optimal. The vessel 210 may be jacketed for exothermal and endothermal reactions and a heat exchanging coil may be provided within the reactor. In sulfonation, it is preferable to control the reaction temperature by subcooling the liquid feed.

As noted, any reactive gas-liquid system may be reacted in the processes and apparatus described. Thus halogen fluids such as chlorine gas and chlorinatable liquids (methane, ethane, propane, 2-methylpropane, butane, 2-methylbutane, n-pentane, aromatics and cycloparaffins and waxes, carbondisulfide, also ethylalcohol) fluorine gas and fluorinatable liquids as for chlorination, plus carbon tetrachloride may be reacted, such chlorinatable and fluorinatable compounds including aromatic organic hydrocarbons, acetic acid, etc. Additionally, the hydration of ethylene oxide may be carried out in this system to provide glycol. Likewise, alkylation of hydrocarbons with hydrofluoric acid vapor is feasible.

The product takeoff through line 229 is passed to neutralization and separation of any diluent hydrocarbons and the sulfonic acids. Even at optimal utilization of nondiluted sulfur trioxide and sulfonatable hydrocarbons, some subsequent processing is required. By the instant system the load on the subsequent processing systems is minimized.

GAS-LIQUID RECYCLE REACTION SYSTEM

Figure 8:
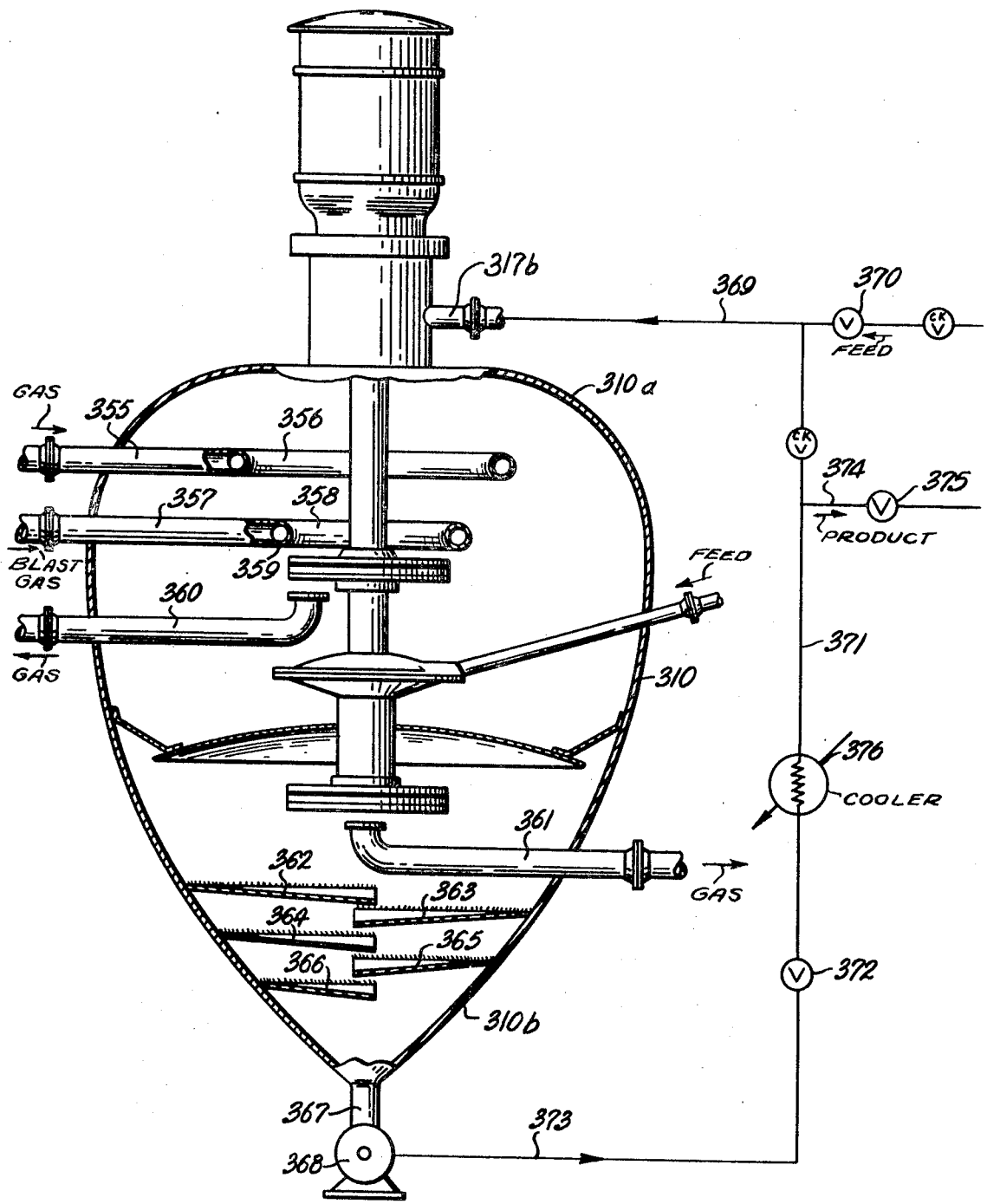
FIG. 8 is a view analogous to that of FIG. 7 but showing a different reaction vessel with a different rotor and said arrangements to handle multiple or sequential chemical reactions.

FIG. 8 is a schematic flow diagram showing a system particularly adapted for accomplishing complete sulfonation in a single vessel, most particularly in one utilizing a multiple orifice atomizing rotor in certain of the process variations previously discussed. As was previously noted, under certain conditions, in excessive dilution or nondilution of either or both the reactive gas (say, sulfur trioxide) and reactive liquid (say, sulfonatable hydrocarbon), in single or multiple orifice rotor systems utilizing a confined nongas blasted continuous phase reactive gas atmosphere with respect to the reactive liquid, and even in gas blasted single (rarely) and multiple orifice rotor applications of gas-liquid reaction systems, there arise problems of incomplete sulfonation of the sulfonatable liquids. Also as previously noted, it is desirable to confine the reaction to the spray device discharged atomized particle stream in its flight and at its point of impact on the vessel wall with little or no sulfonation reaction thereafter. Also, it is desired to use stoichiometric quantities of the reactive gas and reactive liquid unless series flow where liquid is in series and gas is staged or, if there is a difference in such ratio, it preferably errs or differs in the direction of a lesser quantity of the reactive gas, particularly in highly reactive systems such as sulfur trioxide sulfonation. If a multiple contact with the reactive gas or reactive gas atmosphere is required, either in multiple passes through a series connected set of reaction vessels and atomizing rotors therein, or in a recycle series of passes through a single rotor, it is far more desirable that the reactive gas or reactive gas atmosphere have its opportunity to contact the yet nonsulfonated sulfonatable liquid in (1) again only the projected atomized screen of particles and the impact point and/or (2) after the yet unsulfonated sulfonatable liquid has been remixed with the reaction product. This tends to avoid the most dangerous and objectionable reaction happening with respect to the integrity of the product, namely, the opportunity of the reactive gas to continuously or for a long period contact a limited surface or zone of the reaction product in such a situation as would occur if the (reactive gas) sulfur trioxide were to be free in the vessel zone from which the reaction product is being withdrawn.

Accordingly, I have developed process and apparatus for optimal control of such successive reactive gas (or sulfonation) passes, either in one or more reaction vessels and atomizing or spray devices, the latter series connected (that is, from the reaction produce output of one reaction vessel to the input of the spray device of a second rotor, etc.). The latter alternative has been described, previously with respect to FIG. 7. The former situation, namely, a recycle of nonsulfonated liquid and reaction product mixed therewith for one or more successive passes through a spray device in a reaction vessel whereby to achieve complete sulfonation with minimum product deterioration, polysulfonation, charring and tarring.

Referring, then, to FIG. 8, therein is shown a modified atomizing rotor array (compared to that of FIG. 7) wherein the assembly basically comprises a drive shaft from a single power source upon which two atomizing rotors are mounted, whereby to spin simultaneously. Liquid feed means are provided into the center of each rotor, the feed to the top rotor running from the top connection, the feed to the bottom rotor running from a separate input line intermediate the height of the vessel.

Figure 9:
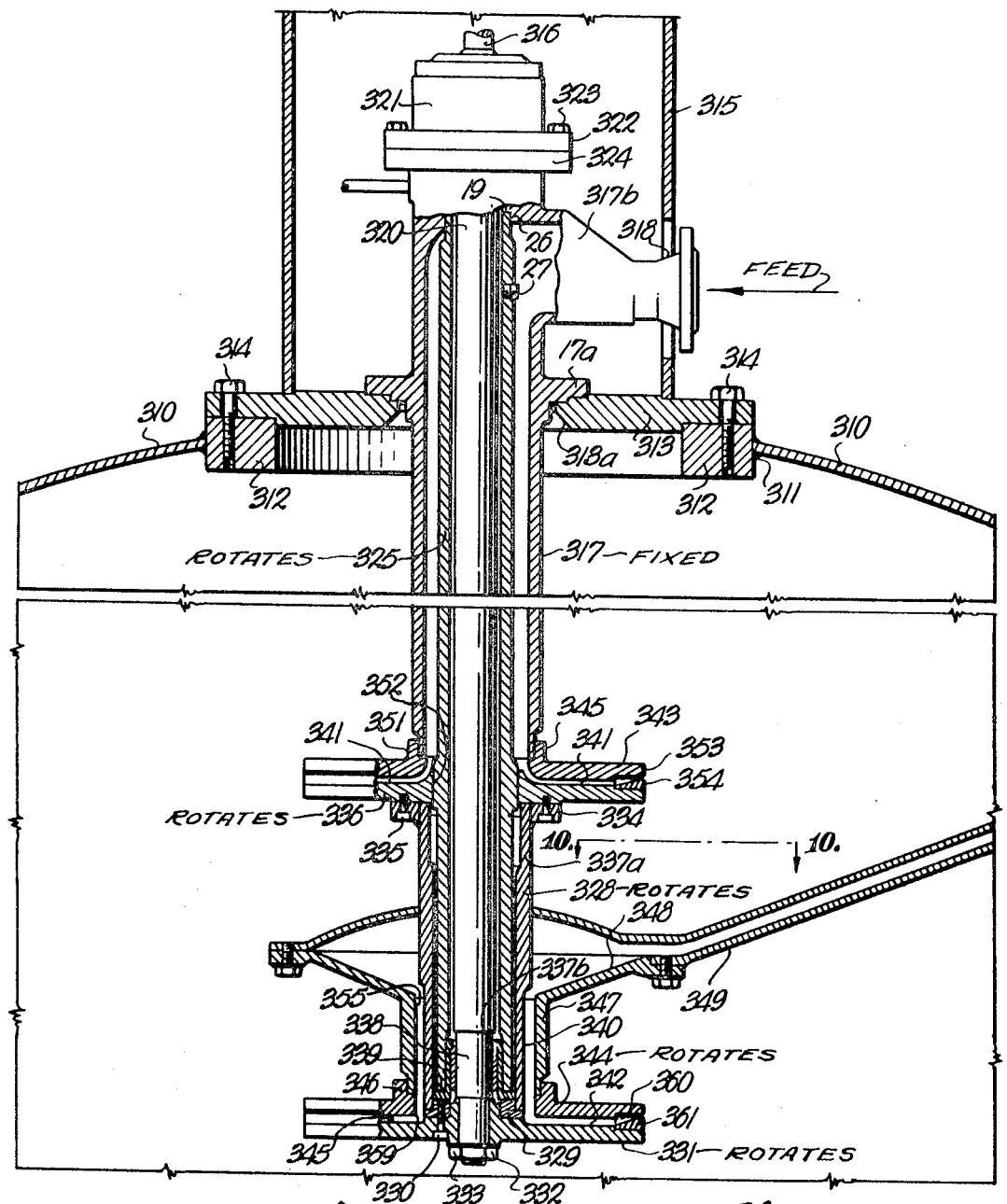
FIG. 9 is an enlarged sectional detail of the approximate position of FIG. 8.
Figure 10:
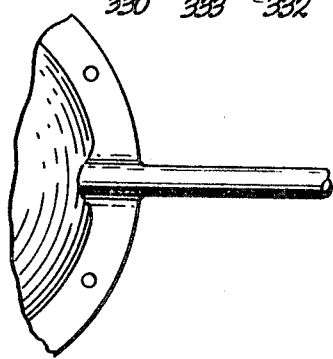
FIG. 10 is a view taken along the line 10—10 of FIG. 9 in the direction of the arrows.

The view of FIG. 9 details the atomizing means and apparatus of FIG. 8 wherein the vessel upper wall 310a has an opening 311 centrally thereof which mounts mounting ring 312. A plate 313 is fixed by bolts 314 to a ring 312 and has motor mounting supports 315 extending upwardly therefrom. Fixed to the top of support 315 is any suitable prime mover to drive a shaft 320 at necked down portion 316, the motor not shown.

A static, nonrotating feed housing generally designated 317 has mounting flange 317a thereof received in a series of stepped ledges at opening 313a in mounting plate 313. Feed housing or tube 317 extends vertically downwardly from flange 317a and vertically upwardly therefrom, then taking a right-angle turn as at 317b out of mounting means 315 through opening 318 therein. Flanges 317a may be welded or bolted to plate 313. The upper portion of housing 317 has drive shaft passage 319 therethrough to receive main drive shaft 320 rotatably therethrough, drive shaft 320 extending through seal and bearing housing 321 as a necked down portion 316. Seal and bearing housing 321 is mounted by a flange 322 and bolts 323 on the flange top 324 of the feed tube on housing 317.

Fixed to feed tube 317 is bearing tube 325 which is fixedly attached to the upper portion of the feed tube at 26. Spacers (not shown) centrally position tube 325 relative to feed tube 317. A secondary outer sleeve 328 encircles the lower end of sleeve 325 and is welded or otherwise rigidly fixed to ring 329 which is bolted as at 330 to the lower disc of the lower atomizing rotor to be described, the lower disc designated 331. Lower disc 331 is keyed or otherwise rigidly fixed to the lower end of drive shaft 320, in a necked down portion thereof 332 and removably fixed thereon by nut 333. At the upper end of sleeve 328 is welded ring 334 to which is bolted by bolts 335 the lower disc 336 of the upper atomizing rotor.

The sequence of parts immediately above described shows that sleeve 328 is rigidly fixed to shaft 320 whereby to rotate therewith and also carry the lower disc of each rotor therewith.

A bearing 337a is provided in the annulus between sleeves 325 and 328 below disc 336 of the upper rotor. A bearing is likewise provided at 337b between sleeve 325 and shaft 320 adjacent the lower end thereof in a slightly necked down portion 338. The bearing 337b is retained by ring 339 which is bolted onto the lower end of sleeve 325 by bolt 340. Removably bolted to the lower disc 336 of the upper rotor and the lower disc 331 of the lower rotor or welded thereby by suitable liquid accelerating vanes 341 and 342 in the rotors respectively, are upper discs 343 and 344 which have upwardly extending inwardly stepped seal flanges 345 and 346 adapted to make a rotating liquid seal against the feed tube 317 in the case of upper disc 343 and a secondary feed tube 347 which is attached to the liquid distributing flange mounted circumferentially to sleeve 328 and circumferentially enclosing same except for its connection to feed input pipe 349 extending out of the vessel 310 intermediate the ends thereof.

In operation of the rotors of FIG. 8, it is assumed that shaft 320 turns, carrying the lower rotor discs 331 and 336. As the upper rotor discs 343 and 344 are fixed thereto, the entire rotor assemblies both spin together. Liquid is first fed in through feed tube 317b and down the annulus between the feed tube 317 and sleeve 325. An outwardly extending ring annulus 351 defined by the upwardly curved portion 352 of lower flange 336 centrally thereof and the inward portion of the upper disc 343 extends into the accelerating vane zone designated 341. The rotation of the discs alone is sufficient to force the liquid outwardly, but the accelerating vanes, in the manner shown in the Herbert W. Stratford patent, supra, aids same, forcing the liquid to be atomized out into the necking down atomizing zone 353, defined by angle upper face ring 354. The orifice range may or may not be in the phase defined by the Herbert W. Stratford U.S. Pat. No. 2,990,011, supra, depending upon the results desired to be achieved. However, generally speaking, that range of orifice opening is preferable.

Liquid is also fed in through feed tube 349 into liquid collection flange 348. From flange 348, the liquid passes down into secondary feed tube 347 and thence into the annulus between the discs 344 and 331. Thereafter the action is the same as described above.

In FIG. 8 at 355 is seen the input flow line for a nonblast type gas input ring 356 positioned above the upper rotor and having any suitable openings, slots, slits, etc., formed therein for creating a gaseous atmosphere of a reactive gas above the upper rotor. These openings, as in the case of the openings in the nonblasting input ring of FIG. 7 would generally open downwardly, outwardly and inwardly in the lower portion of the ring 356 to obtain uniform downward passage of the gas from the ring.

At 357 is shown the input pipe for a gas blasting type gas input ring 358 of the type previously described having concentric or circumferential openings, slits or a single slit 359 adapted to pass a gas blast downwardly closely adjacent the discharge orifices of the upper rotor. A gas drawoff line immediately below the upper rotor and above the lower rotor is seen at 360. Immediately below the lower rotor is optional gas outlet line 361, itself and the last mentioned line connected to any suitable source of low pressure or vacuum. A series of alternated vessel spanning (from side to side) baffle plates or sheets 362–366, inclusive, are provided below the lower rotor and the alternate gas withdrawal line, if such is provided. Withdrawal pipe 367 passes to pump 368.

The recycle flow connection includes inlet flow line 369 which passes to the feed nozzle 317b for the top rotor. Valve 370 is positioned thereon before the joinder therewith of recycle flow line 371 having valve 372 thereon. Pump 368 discharges into line 373 which divides into line 371 and product withdrawal line 374 having valve 375 thereon after the takeoff of line 371.

It should be understood that the apparatus of FIG. 8 can utilize single or multiple orifice rotors for either or both the upper or lower rotors, that either the nonblasting or blasting reactive gas input lines may be used and that the baffles 362–366, inclusive, or their equivalent are optional, but preferred in use. The lower rotor is optional, depending on whether a diluent or quenching stage is desired in the same reaction vessel. With the recycle system described, it would not be preferable. Certain secondary reactions may also be carried out for sequential chemical reactions in a single vessel, if desired.

It is also possible to separate the sulfonic acid produced in such a sulfonation reaction and recycle the unreacted raffinate through a cooler into the system. As is well known in the art, the actual sulfonic acid could alternately be recycled for the same purpose.

Cooler 376 is positioned on line 371 past valve 372.

In the apparatus and process of FIG. 8, to begin the recycle process, valve 375 is closed and valves 370 and 372 are opened. Cooling medium is flowed through the heat exchanging or cooling unit 376. The upper rotor is activated and feed thereto through line 369 begun passing valve 370. If the second and lower rotor is to be used or is present, it is also activated and diluent feed thereto begun. In the case of a sulfonation reaction, the feed to the top rotor through line 369 is a sulfonatable hydrocarbon such as dodecylbenzene, while the diluent feed would typically be water. Once the atomization screens or screen of reactive liquid, diluted or not, is set up from the upper rotor, the input of sulfur trioxide is begun either through the nonblasting ring 356 or the blasting ring 358.

A sufficient feed charge of reactive liquid is passed through lines 369 and dispersed from the upper rotor to create an equilibrated recycling liquid system, that is, the system is liquid full in recycle flow with lines 373, 371, 369 continuously full, the upper rotor being continuously fed and the sump above line 367 and pump 368 always having content. This involves the capacity of the lines, the vessel capacity, the pump capacity, the rotor capacity, the cooler capacity, etc. It should be noted that the instant process is optimal for 100 percent pure reactants, that is, for example, 100 percent pure sulfur trioxide gas and 100 percent pure sulfonatable liquid such as dodecylbenzene. The precooler is of such capacity to cool the volume of liquid passing therethrough on each pass to a predetermined degree, typically 70° F. in the case of dodecylbenzene and sulfur trioxide. The liquid input through line 369 has also been cooled to such degree initially prior to passage into the system.

The object of the instant procedure is to make available only sufficient reactive gas to (1) react with a limited portion of the reactive liquid passing out of the rotor at any given time and (2) only permit the temperature (in an exothermic gas-liquid reaction such as the sulfonation reaction being described) to a limited degree (sulfonation optimal limit is 130° F.–135° F.) (As previously noted, if the recycle system is used, the diluent is not preferred. If recycle plus diluent, a diluent separation step must be included in the recycle system). The liquid is then recycled a plurality of times through the upper rotor, at each pass contacting an additional charge of reactive gas working up to the situation that, at the final pass through the rotor, a stoichiometric quantity of reactive gas will have been passed into the reaction vessel whereby to have theoretically achieved complete reaction. The optimum number of recycles after the first pass is nine so that there are a total of 10 passes of the charge of material through the rotor. Thus, 1/10 th of the total quantity of reactive gas would be passed into the vessel calibrated to the time of passage for one charge through the rotor.

The baffles 362–366 preferably downwardly slanted insure that there is no quiescent zone in the reactor for the liquid being processed to aggregate in whereby, even if the reactive gas atmosphere penetrates to some degree into the zone below the screen or screens of atomized reactive liquid, there will be a minimum opportunity for continued contact of the reaction product containing the nonsulfonated material to contact the reactive gas atmosphere. It should be noted, however, that the presence of the limited quantities of reactive gas relative to the amount of unsulfonated material reduces the problem, as does the presence of the sulfonated material in increasing proportion, the reaction product after each pass, which "diluent" of the reaction produce moving down the sides of the vessel wall will itself tend to depress any polyreaction of the already reacted material.

As above noted, the use of a multiple orifice rotor in the upper rotor position with a gas blasting gas input means or with the nonblasted input means or the nonblasting means and single orifice rotor give additional control in this situation.

After the requisite number of passes through the system and upper rotor, valve 372 is closed and valves 370 and 375 are open. The fully reacted or substantially fully reacted reaction product will then be moved out of line 373 and into line 374. At the same time, a new input charge will maintain the feed to the upper rotor continuous in action with new increments of reactive gas being passed into the system through line 335 or 357 in the manners described. Once the first charge quantity has been removed from the system, valve 375 is again closed and valve 372 opened. Pump 368 operates continuously whether in product withdrawal or recycle. As previously noted above, the lower orifice gaps in the upper rotor, if such is a multiple orifice rotor, are closed to a minimum opening whereby to pass a minimum (relative) quantity of reactive liquid therethrough. This also means finer atomization and greater accessibility and susceptibility to reactive gas penetrating to such layers or screens. This is equivalent, that is, the finer orifice gap atomization, to an excess of reactive gas because of the greater surface area of the liquid exposed thereby. The holding periods in the reaction steps, particularly in the instant process, as in the sump, passing over the baffles and moving down the reactor walls, give required digestion time for many gas-liquid reaction systems. Sulfonation particularly seems to require such digestion time to permit the product the come to reactive stability.

If desired, the line 374 may be the feed to the upper rotor of a reaction vessel as in FIG. 7 or the upper rotor and recycle system of another reactor and recycle system identical to that of FIG. 8. The sulfur trioxide gas feed is continuous and uniform.

If input feed of, say, sulfonatable liquid through line 369 is 500 gallons per minute, the discharge rate from pump 368 is 500 gallons per minute and the recycle rate through lines 371 and 369 is the same. If the sulfonatable liquid is recycled nine times after the first pass, then the output rate through line 374 is 500 gallons per minute for 1 minute out of 10 or equivalent to 50 gallons per minute.

The maximum sump level at any phase of the feed and recycle process, including withdrawal while new feed is coming in is preferably below the top baffle 362. Baffling is optional if the liquid volumetric capacity of the piping and cooler is sufficient to permit operation of the reactor with no liquid level therein.

Sulfur dioxide gas or any byproduct gas in other gas-liquid reaction systems is withdrawn through line 360 and optionally through line 361.

This process utilizes intermittent feed through line 369 of reactive material, preferably 100 percent reactive and uniform and continuous feed of reactive gas as the optimum procedure. As the quantity of reacted reactive liquid builds up in the charge recycling through the rotor, the heat sump in the liquid changes from the unreacted reactive liquid to the reaction product. Cooling coils and jacketing may also be employed to aid in temperature control as in jacketing of the complete external shell or building a honeycomb of tubes from the bottom of the shell up to the rotor.

From the foregoing it will be seen that this invention is one well adapted to attain all of the ends and objects hereinabove set forth, together with other advantages which are obvious and which are inherent to the process.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. The apparatus for contacting a reactant liquid and a reactant gas to effect and to control a highly reactive chemical reaction and for contacting the liquid reaction product of said reaction and any unreacted reactant liquid with an additional liquid; said apparatus comprising:

a vertical, closed shell reaction vessel;

first liquid input means to deliver reactant liquid to said vessel;

first liquid atomizing means centrally disposed within said vessel and connected to said first liquid input means to receive the reactant liquid therefrom and to disperse said reactant liquid outwardly in the form of a spray or finely divided liquid particles to provide a uniform, continuous screen of liquid so dispersed across the full cross section of said vessel and substantially normal to the vertical axis of said vessel to define therein and thereabove a reaction zone, said first atomizing means operative to deliver substantially all of said reactant liquid to the interior of said vessel at the surface on which said screen impinges said vessel;

driver means operable to rotate said first liquid atomizing means;

gas input means located above said first liquid atomizing means to deliver reactant gas to the interior of said vessel above said liquid screen;

second liquid input means to deliver additional liquid to said vessel;

second liquid atomizing means centrally disposed within said vessel beneath said first liquid atomizing means and connected to said second liquid input means to receive the liquid therefrom and to disperse said liquid outwardly in the form of a spray or finely divided liquid particles to provide a second uniform, continuous screen of liquid dispersed across the full cross section of said vessel and substantially normal to the vertical axis of said vessel to contact said liquid reaction product and any unreacted reactant liquid;

driver means operable to rotate said second liquid atomizing means; and product withdrawal means to transport liquid from said reaction vessel;

and pressure control means located below said first liquid atomizing means operable to maintain said vessel at a predetermined pressure, said pressure control means including a vapor withdrawal pipe.

2. The apparatus as in claim 1 including recycle means connected with said product withdrawal means and said first liquid input means and operable to deliver liquid from said product withdrawal means to said first liquid input means.

3. The apparatus as in claim 1, said gas input means including a gas blasting ring centrally positioned within said reaction vessel above said first liquid atomizing means and operable to discharge reactant gas downwardly toward and concentrically around said first liquid atomizing means.

4. The apparatus as in claim 3, said gas input means also including a gas nonblasting ring centrally positioned within said reaction vessel above said gas blasting ring and operable to provide essentially a stagnant atmosphere of said reactant gas above said liquid screen.

5. The apparatus as in claim 1, said pressure control means including a second vapor withdrawal pipe positioned beneath said second liquid atomizing means and operable to assist said vapor withdrawal pipe beneath said first liquid atomizing means in maintaining said vessel at a vacuum condition.

6. The apparatus as in claim 1 wherein said driver means operable to rotate said first liquid atomizing means is also operable to rotate said second liquid atomizing means.

7. The apparatus as in claim 1 including a deflector shield mounted within said vessel between said first and second liquid atomizing means and operable to permit liquid in said vessel above said shield to flow to that portion of the vessel beneath said shield via the wall of said vessel.